(12) United States Patent
Karasch et al.

(10) Patent No.: US 7,866,254 B1
(45) Date of Patent: *Jan. 11, 2011

(54) BEVERAGE INFUSION SPIRAL AND METHODS OF MAKING AND USING THE SAME

(75) Inventors: Russ D. Karasch, Avon, MN (US); Peter S. Theisen, St. Cloud, MN (US); John A. Theisen, St. Cloud, MN (US)

(73) Assignee: Riverside Rockets, Ltd., St. Cloud, MN (US)

( * ) Notice: Subject to any disclaimer, the term of this patent is extended or adjusted under 35 U.S.C. 154(b) by 231 days.

This patent is subject to a terminal disclaimer.

(21) Appl. No.: 12/032,980

(22) Filed: Feb. 18, 2008

Related U.S. Application Data (63) Continuation of application No. 10/884,607, filed on Jul. 2, 2004, now Pat. No. 7,357,069.

(60) Provisional application No. 60/485,319, filed on Jul. 7, 2003.

(51) Int. Cl.
*C12H 1/22* (2006.01)

(52) U.S. Cl. ............... 99/277.1; 99/277.2; 144/371; 144/368; 144/365; 144/362

(58) Field of Classification Search ............... 99/277.1, 99/277.2, 277; 426/422, 330.4; 144/362, 144/363, 365, 368, 371
See application file for complete search history.

(56) References Cited

U.S. PATENT DOCUMENTS

| 273,860 | A | 3/1883 | Lachenmeyer |
| 334,222 | A | 1/1886 | Fitch |
| 429,826 | A | 6/1890 | Wagoner |
| 818,478 | A | 4/1906 | Shwayder |
| 1,976,091 | A | 10/1934 | Pritchett |
| 2,017,235 | A | 10/1935 | Drew |
| 2,079,378 | A | 5/1937 | Mills |
| 2,086,073 | A | 7/1937 | Francescon |

(Continued)

*Primary Examiner*—Reginald L Alexander
(74) *Attorney, Agent, or Firm*—Albert W. Watkins (57) ABSTRACT

A liquid may be aged and infused using a wooden infusion apparatus having grain oriented along a longitudinal axis of a rod. One preferred infusion apparatus comprises machining a grain oriented wooden cylinder into the shape of a spiral having a longitudinal central axis. A preferred method is disclosed for continuously machining wooden rods into spirals, and subsequently toasting them. Another infusion apparatus comprises a plurality of wooden discs connected by a longitudinal central axis in the form of a rod, the wooden discs which are toasted. The present invention allows for more control over the time required to properly age the wine and to impart the wood flavor by giving the producer more control over the amount of wood surface area that is exposed to the wine. The rate of infusion is increased substantially when the wood grain extends along the longitudinal axis of the infusion apparatus. The shape and size of the infusion apparatus may be customized to fit any container from a huge wine barrel to a small liquor bottle. Additionally, the infusion spiral may be connected to a lid or bung of a container, and may thereby be removed when desired by merely opening the lid or bung. The infusion spiral can be replaced, by this same manner, with a different type of wood infusion spiral or a fresher infusion spiral to enhance the flavor imparted to the wine without having to fish around in the container for the infusion spiral.

9 Claims, 8 Drawing Sheets

U.S. PATENT DOCUMENTS

| | | |
|---|---|---|
| 2,108,661 A | 2/1938 | Farrier et al. |
| 2,114,009 A | 4/1938 | Ramsay |
| 2,195,662 A | 4/1940 | Sant |
| 2,203,229 A | 6/1940 | Nilsson et al. |
| 2,289,245 A | 7/1942 | Dant |
| 2,487,594 A | 11/1949 | Rudnick |
| 2,876,692 A | 3/1959 | Gaisman |
| 3,372,633 A | 3/1968 | Horlander, Jr. |
| 3,842,723 A | 10/1974 | Boucher |
| 3,942,423 A | 3/1976 | Herzfeld |
| 4,173,656 A | 11/1979 | Duggins |
| 4,558,639 A | 12/1985 | Hojnoski |
| 5,054,381 A | 10/1991 | DePeaux et al. |
| 5,102,675 A | 4/1992 | Howell et al. |
| 5,174,461 A | 12/1992 | Sullivan |
| 5,481,960 A | 1/1996 | Sullivan |
| 5,537,913 A | 7/1996 | Vowles |
| 5,647,268 A | 7/1997 | Sullivan |
| 6,203,836 B1 | 3/2001 | Gross, II et al. |
| 6,378,419 B1 | 4/2002 | Ecklein |
| 7,357,069 B1 | 4/2008 | Karasch et al. |
| D584,564 S | 1/2009 | Karasch |
| 7,594,468 B2 | 9/2009 | Kania et al. |

BEVERAGE INFUSION SPIRAL AND METHODS OF MAKING AND USING THE SAME

CROSS REFERENCE TO RELATED APPLICATIONS

This application is a continuation of application Ser. No. 10/884,607 filed Jul. 2, 2004 now U.S. Pat. No. 7,357,069 and presently allowed, naming the present inventors, which in turn claims priority to U.S. provisional application Ser. No. 60/485,319 filed Jul. 7, 2003, the contents of each which are incorporated herein by reference in entirety.

BACKGROUND OF THE INVENTION

1. Field of the Invention

This invention pertains generally to treatment of liquids, and in a more preferred manifestation of the invention to beverage treatment apparatus and methods. In one preferred manifestation, the invention pertains to wine or liquor-making processes and equipment and, more specifically, relates to an improved toasted wooden infusion spiral to impart a distinctive flavor and scent through an aging process.

2. Description of the Related Art

During various fermentation, distillation, and synthesis processes, very complex liquid mixtures of chemical compounds may be formed. Liquids to which the present invention applies, for exemplary purposes only and expressly not limiting the scope of the invention thereto, may include wines, liquors, other alcoholic or spirited mixtures, vinegars, mixtures of solids and liquids such as mustard and ketchup, various other consumables, perfumes, essential oils, various other non-consumables, and the like. These liquids, as a by-product of their creation, will frequently include as components such families of compounds as alcohols, ethers, ketones, aldehydes, organic acids, amines and amides, alkaloids, sulfur compounds, and other simple and complex compounds too numerous to specifically mention herein. While some of these compounds are highly desired, others may impart a less desirable flavor or scent. However, using laboratory processes to compose or manipulate these compounds and still produce a desired product is often not possible, either economically or at all. The compositions are, quite simply, too complex for effective laboratory synthesis.

Through many centuries, a process of aging beverages such as wines, liquors, and the like in toasted wooden containers has been perpetuated which, given the appropriate source liquids, will produce a highly desired resulting composition. The toasted wood is believed to interact with the various compounds described above, absorbing and thereby removing some, reacting with others, and releasing still others into the liquid.

Historically, this aging process occurred by keeping the beverage in a toasted or charred wooden container, whether barrel or other shape or design, for a period of time. With sufficient time, the interaction occurs between the wood and liquid contained therein. In the case of wines and liquors, such aging allows for the ripening of the flavors and for the removal of harmful component parts of the original wine product. Additionally, the wooden material used in the fabrication of the container imparts an additional flavor to the liquid which is characteristic of the wood and the preparation of the wood. Often, oak containers are chosen for wines and liquors, owing to the distinctive and desirable flavor infused.

Unfortunately, as is also known, the aging process in wood containers tends to be very slow and takes place over a time span often measured by years. The wood, and the flavor imparted thereby, can change according to the humidity and other atmospheric conditions surrounding the wood, often necessitating the use of special cellars or storage facilities to maintain desirable conditions while protecting the perishable containers. Furthermore, oak does not have fine, linear and consistent grain, but is instead coarse and erratic. Consequently, there exists a potential for leaks directly through the grains or any defects in the wood. Such leaks may not be revealed immediately, but may instead appear after much aging. Owing again to the erratic grains, the fabrication of typical containers such as barrels from staves is quite costly and difficult. Even after being fabricated, additional expenses are incurred transporting these containers to their point of use since they are bulky and heavy. Finally, these containers can be expensive and difficult to maintain, and will require complete replacement when the aging processes have consumed the ability of the wood to interact properly with the liquid.

Containers have been manufactured from other materials such as glass, plastic, and metal. These containers address many of the aforementioned drawbacks of the wooden containers, but do not infuse the wine with the desired flavoring, nor otherwise interact in a positive way. Consequently, wooden containers have historically been highly preferred.

In order to provide the benefits previously obtained from wooden containers, apparatus for treating the liquid have been developed. Commonly referred to as infusion or aging means, these apparatus come in a variety of shapes, sizes, materials, and the like. Examples of known infusion means are illustrated, for exemplary purposes, by U.S. Pat. No. 2,114,009 to Ramsay. In Ramsay, cut shapes of wood with various cross-sectional geometries are presented. These wooden dowels are provided with an enlarged top, a smooth cylindrical neck, and a cut and drilled active region. However effective the Ramsay approach might have been, the manufacturing process required for the production of the apparatus is complex and expensive. In spite of the extra cost, only marginal benefit from such an apparatus may be obtained in use.

Other approaches have been presented which merely insert oak staves or boards directly into a container. Exemplary of these are U.S. Pat. Nos. 2,017,235 to Drew; 2,079,378 to Mills; 2,289,245 to Dant; 3,942,423 to Herzfeld; and 5,054,381 to DePeaux et al. These approaches permit the continued re-use of a barrel, by permitting replacement of the staves that have been inserted, rather than requiring an entirely new container. Nevertheless, the insertion of the boards requires that the boards be sized to correspond to the container, and may in some instances require that the oak or other wood be custom cut for each container geometry.

In order to provide more universal application, and to avoid the need for larger knot or defect-free lengths of oak, various artisans have proposed the use of smaller chips or cubes of wood, which are then held within one of a variety of permeable secondary containers within the larger container. Exemplary of this approach are U.S. Pat. Nos. 818,478 to Shwayder; 1,976,091 to Pritchett; 2,086,073 to Francescon; 2,203,229 to Nilsson et al; 5,102,675 to Howell et al; and 5,481,960 and 5,647,268 to Sullivan. These approaches offer the benefit of many smaller cubes of wood, to obtain similar surface area as that present on the inside of a wooden barrel. The cubes may readily be replaced at will. However, these cubes again provide only nominal improvement in the time required for aging. In these designs, there is no spacing between the wood chips or cubes. Consequently, the time for aging may in fact be quite unpredictable, since the interaction between liquid and wood will depend upon how the cubes happen to stack within a given container. Furthermore, cubes are more troublesome with more viscous liquids, such as pastes, presenting problems both during infusion and with separation of liquid from cubes. Finally, and perhaps of greatest import in the industry, these cubes are not readily identifiable to their source within a tree. Very harmful flavorings may be extracted from wood which is either core wood, knotty, or presents other defects. Yet, when the wood is cut into these small cubes or sections, such defects will not readily present themselves. As a result, the wine maker, spirits brewer or other liquid processor loses much ability to inspect and control the quality of the wood used. This has led to a complete rejection of the chips and cubes by many producers.

Other more esoteric approaches have been presented for the treatment of spirits, exemplified by U.S. Pat. No. 334,222 to Fitch; U.S. Pat. No. 429,826 to Wagoner; U.S. Pat. No. 2,195,662 to Van Sant; U.S. Pat. No. 5,537,913 to Vowles; U.S. Pat. No. 6,203,836 to Gross et al; and U.S. Pat. No. 6,378,419 to Ecklein. Nevertheless, these prior art approaches at best attempt to mimic the performance of a high quality wooden container, and do little more for the distiller, wine maker, chemical processor, or other producer.

SUMMARY OF THE INVENTION

The present invention provides improved apparatus for use in imparting a distinctive flavor to wines, beverages, and other liquids. In addition, the present invention provides several methods for manufacturing the preferred apparatus.

In a first manifestation, the invention is a wooden cylinder machined into the shape of an infusion spiral having a generally cylindrical outline, a longitudinal central axis, and one or more individual spirals formed into the outline. Most preferably, the wood fibers of the individual spirals and the central axis run parallel to the central axis. In this manifestation, the infusion spiral forms a continuous spiral inclined plane.

In a second manifestation, the invention is a wood infusion spiral having a multitude of discs connected by a central axis in the form of a rod, wherein the fibers of the wood discs and the fibers of the wood rod run parallel to the central axis.

In a further definition of the invention, the infusion spiral may be connected to the lid or bung of the container and removed when desired by merely opening the lid or bung. The infusion spiral can be replaced, by this same manner, with a different type of wood infusion spiral or a fresher infusion spiral to enhance the flavor imparted to the wine without having to dip or fish into the container to locate the infusion wood.

In a third manifestation, the invention is a method for manufacturing an infusion spiral in an economical and automated fashion. A receiver is provided, which receives at an inlet wooden preforms, and allows a single preform at a time to pass through an outlet in the receiver. Adjacent the receiver outlet is a guide that directs the preform into a cutting blade. The blade is angled with respect to the longitudinal axis of the preform, and cuts a continuous spiral therein. A second guide continues to direct the preform. Once the spiral has been cut, the preform is then toasted to present a charred exterior surface.

OBJECTS OF THE INVENTION

A first object of the present invention is to infuse a liquid using wood, without having to age the liquid for extended periods in a wood container. A second object of the invention is to allow for more control over the time required to properly age the liquid and to impart desired chemical constituents while reacting or removing other constituents. Another object of the present invention is to decrease the amount of time required to age wine. A further object of the invention is to enable the apparatus designed in accord with the invention to be shaped and sized to fit any container from a huge wine barrel to a small liquor bottle. Yet another object of the present invention is to enable replacement of the infusion spiral with a different type of wood infusion spiral or a fresher infusion spiral, without having to dip or fish into the container to locate the infusion wood. An additional object of the invention is the provision of an infusion apparatus meeting the foregoing objectives using manufacturing processes which allow the apparatus to be produced economically.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, provided herein for purposes of illustration and not limitation, in which.

DESCRIPTION OF THE PREFERRED EMBODIMENT

The following disclosure is provided in accord with the requirements of the statutes to render these preferred, alternative and other embodiments of the present invention readily apparent to those skilled in the art.

Figure 1:
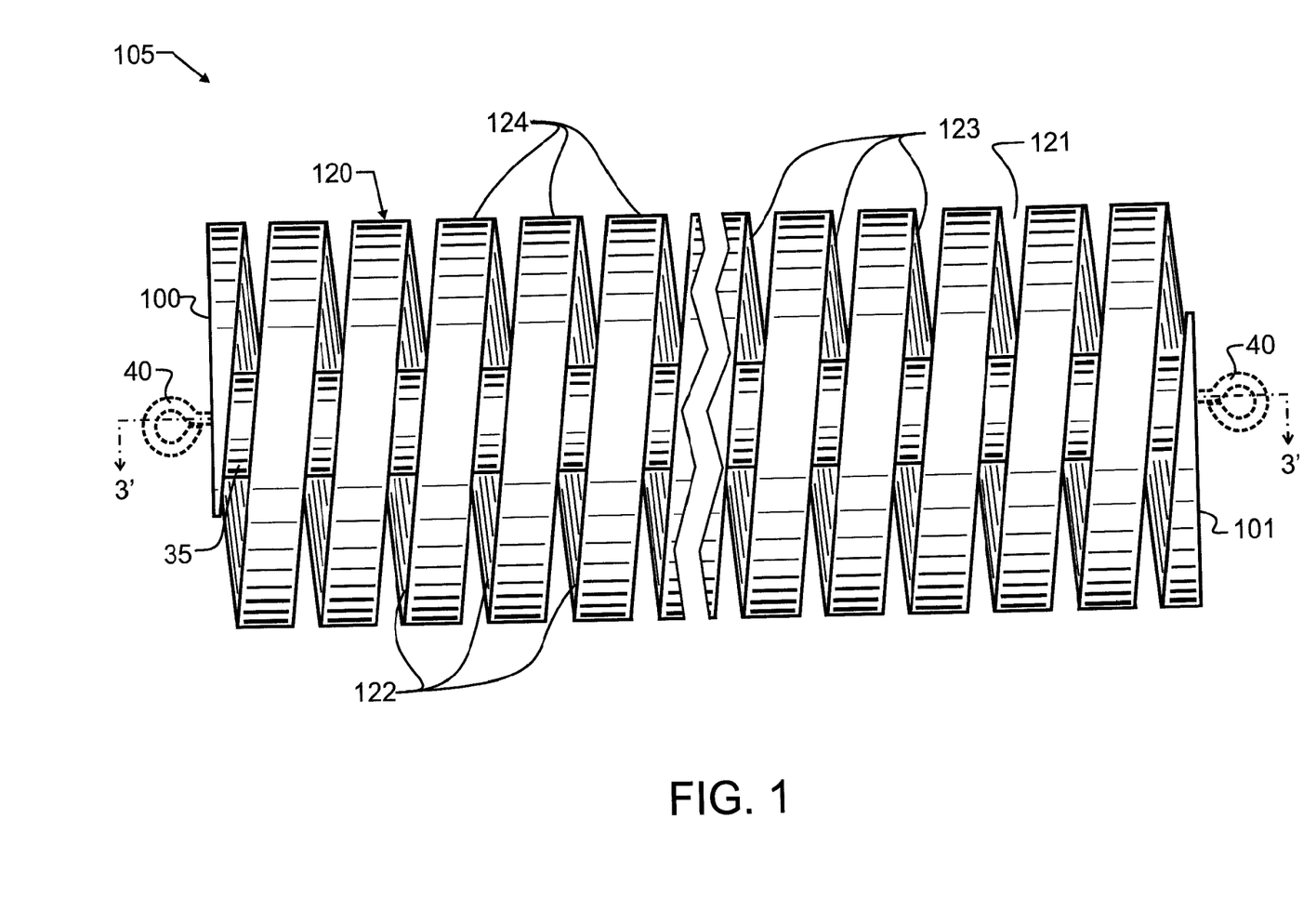
FIG. 1 illustrates a preferred infusion spiral designed in accord with the teachings of the invention, having an indeterminate length as shown through the central broken lines, drawn from a front plan view though it will be understood that the invention will have the same spiral appearance from top, bottom, and rear plan views as well, and only the orientation of the termination of the spiral and fastener will change.
Figure 2:
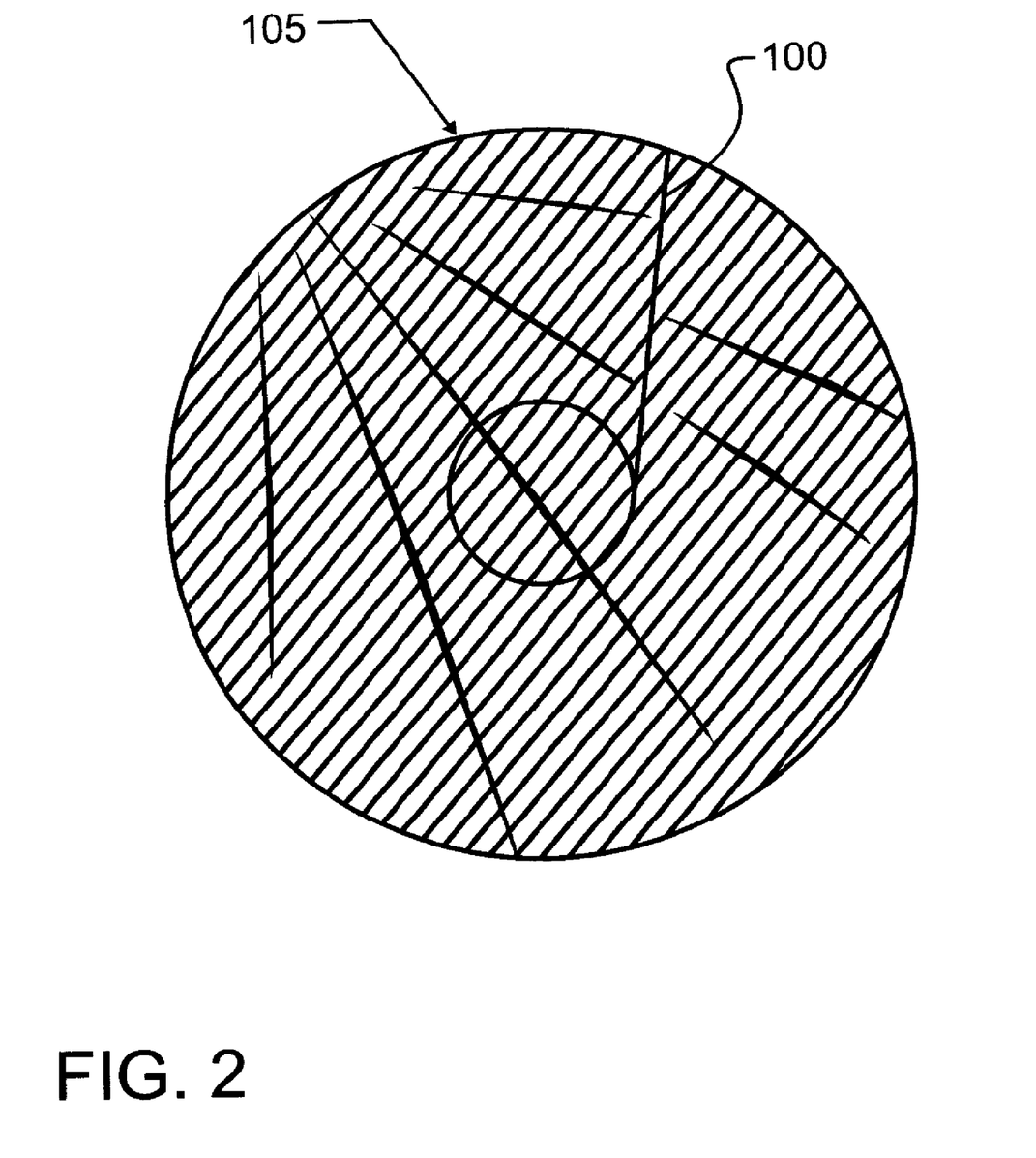
FIG. 2 illustrates the preferred embodiment infusion spiral of FIG. 1 from a right side view, though it will be understood that the invention will have the same appearance the left side view as well, and only the orientation of the termination of the spiral may change.

As shown in FIGS. 1 and 2, the preferred embodiment infusion spiral 105 is illustrated. Infusion spiral 105 may be of any length and diameter, and has opposite ends or termini 100, 101. A core 35 extends from one terminus 100 towards the other terminus 101, and will be designed to have adequate diameter and cross-section throughout to provide sufficient mechanical strength for an intended application. A single spiral 120 extends from around core 35.

In this preferred infusion spiral 105, spiral 120 is continuous, extending from a first terminus 100 of infusion spiral 105 to the second terminus 101, though it will be apparent that with other manufacturing technique it may be possible to manufacture a discontinuous spiral, such as by pulsing a laser or by drilling spirally oriented sequential holes, or the like. Nevertheless, the continuous spiral is preferred, owing to the simplicity of manufacture which will be described herein below. Spiral 120 is defined by a spiral cut 121 which is bordered by a first inclined plane surface 122 and a second opposed inclined plane surface 123. The two inclined plane surfaces 122, 123 together with spiral exterior 124 define the material exterior surfaces of spiral 120. While a single spiral 120 is illustrated, it should be apparent that several parallel spirals may be formed, and may either be parallel and non-intersecting or may alternatively intersect as desired. The various geometries that are available using differing cuts, orientations and dimensions may be used, together with suitable species of wood, to control infusion characteristics with respect to time.

Infusion spiral 105 may in a preferred embodiment be manufactured from a wooden cylinder, which, in the wine and spirits industry, will frequently be a species of oak. Infusion spiral 105 will preferably be toasted, in an oven or the like, to yield a wood most suitable for interaction with spirited beverages. In the most preferred embodiment, the toasting is controlled to produce a darkened appearance evenly throughout the wood, to the very center of core 35. Such controlled toasting is believed to produce the most desirable infusion characteristics for wines. Various degrees of toasting are nevertheless contemplated herein, from an essentially raw lumber to a charred exterior such as might be used in the making of whiskey and the like.

Figure 3:
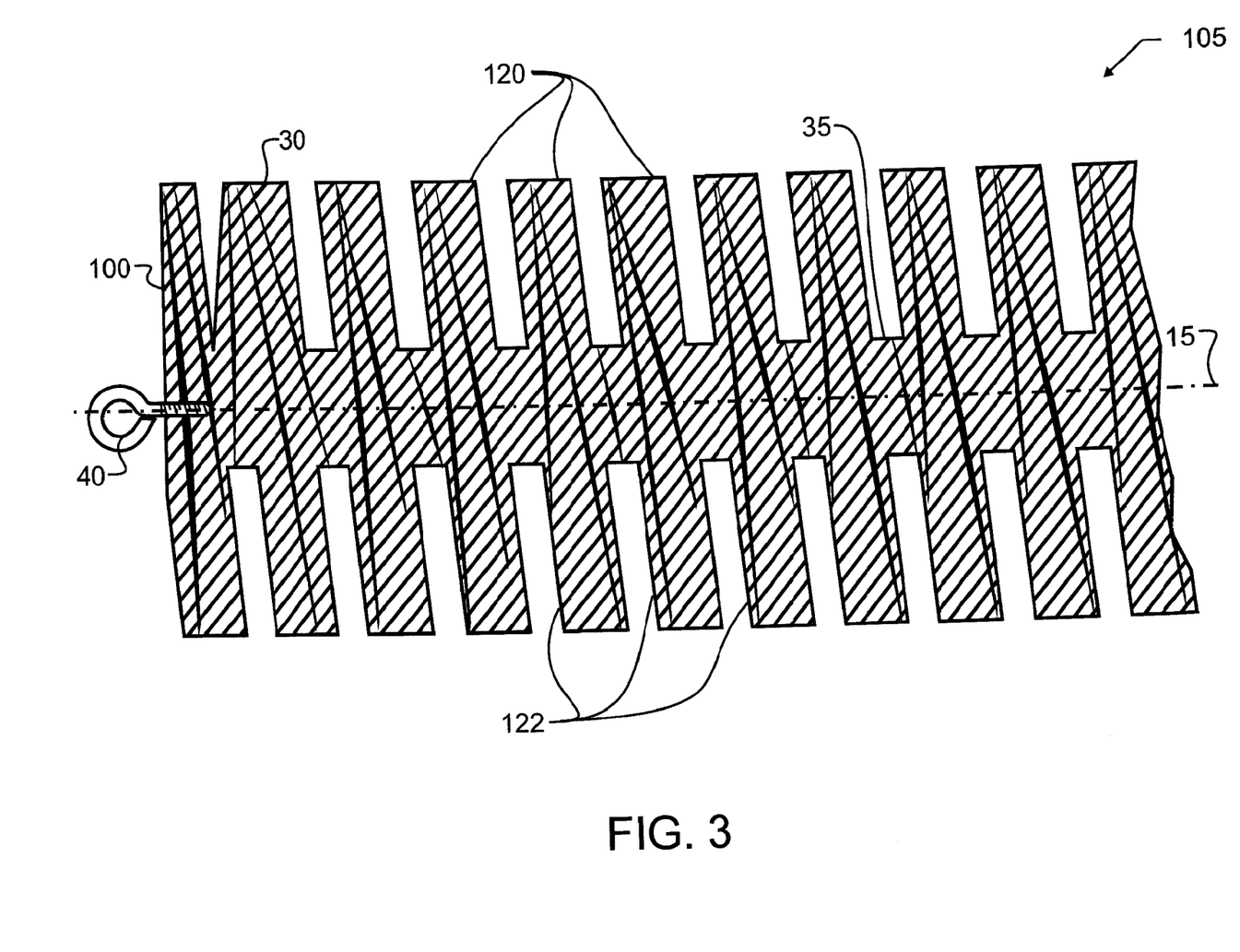
FIG. 3 illustrates the preferred embodiment infusion spiral of FIG. 1 from a cross-section view taken along a longitudinal axis 3' shown in FIG. 1.

As illustrated in FIG. 3, core 35 defines a longitudinal central axis 15. FIG. 3 illustrates terminus 100, but shows a cut-off at the end distal to terminus 100, to illustrate the fact that infusion spiral 105 may be of any indeterminate length along longitudinal central axis 15.

According to a most preferred embodiment, wooden fibers 30 which make up the grain of the wood, including spiral 120, will run parallel to central axis 15. When in contact with a liquid such as wine, the wine will penetrate the wood and interact therewith as previously described. However, the penetration rate varies depending on the amount of available surface area and the type of surface area. While available surface area has been widely recognized in the prior art, the type of surface area has not. Traditional barrels required staves that were liquid tight over long time intervals, so the staves were cut with the intent to expose no grain extending normal to a surface exposed to the liquid. Since the various infusion apparatus have been created, there was not a recognition nor attempt to specifically orient the grain to direct it normal to the primary surfaces. However, the rate of wine penetration into a surface cut across the grain and thereby leaving the grain extending generally normal to the cut surface is many times faster than through a surface cut in the plane of the grain. While not wishing to be bound by any theory, the wine is believed to be wicked or absorbed by capillary action along the wood fibers 30. As can be seen best from the cross-section of FIG. 3, the liquid undergoing treatment by infusion apparatus 105 will enter into spiral cut 121 and contact inclined plane surfaces 122, 123. Since these surfaces account for the vast majority of exposed surface area of infusion spiral 105, alignment of the grain generally normal to these surfaces will provide substantially faster penetration and treatment of the liquid.

While the foregoing discussion details alignment of grain normal to the surface, those familiar with wood, and particularly various oak species, will understand that it would be impractical to expect each and every wood fiber to extend perpendicular to the surface, or for the surface to be aligned exactly perpendicular therewith. However, there will be a general alignment of the fibers within the wood in a first general direction. So long as that direction is reasonably parallel to the longitudinal central axis 15, then the fibers will be open and exposed throughout inclined plane surfaces 122, 123, ensuring fast penetration and infusion.

Figure 4:
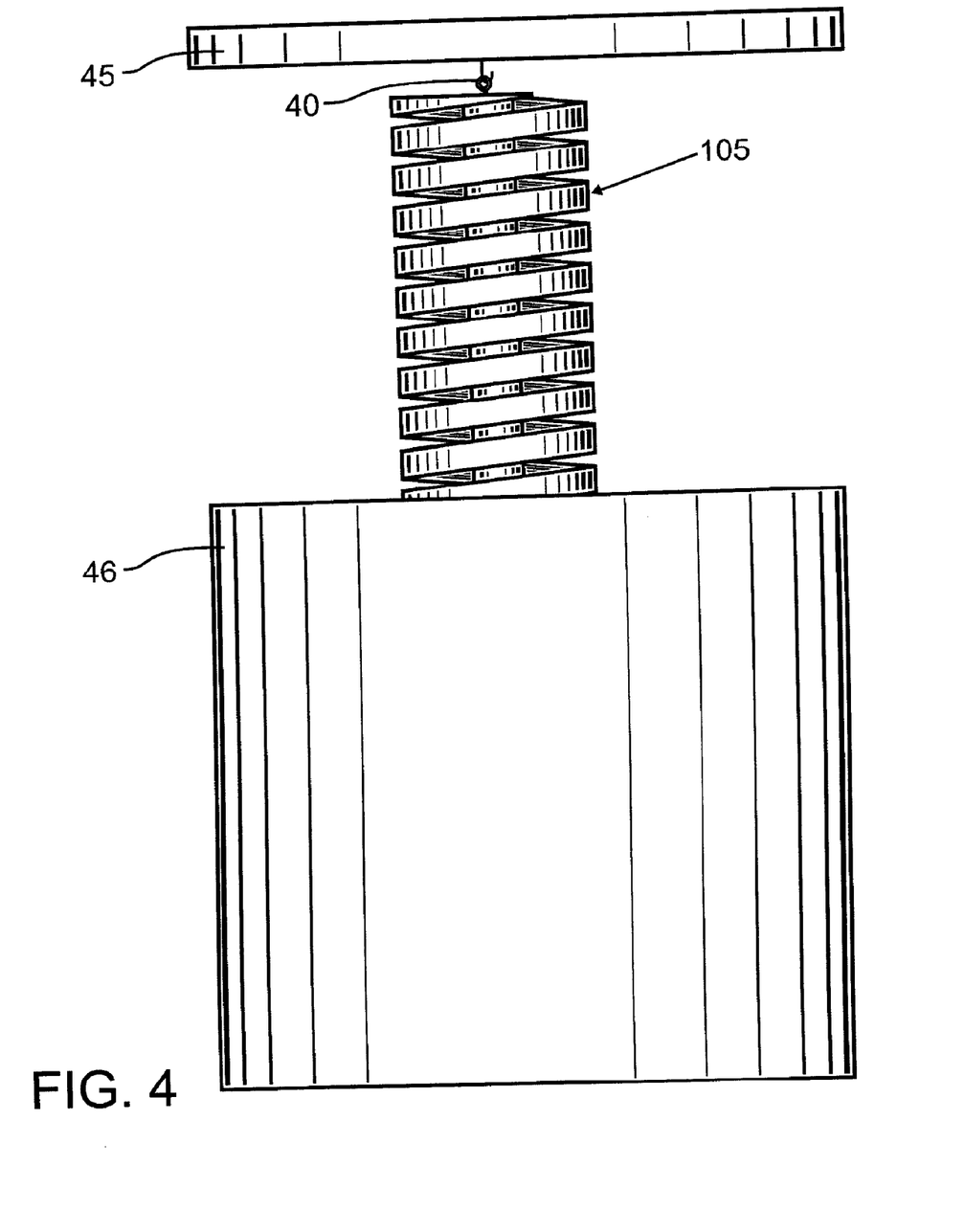
FIG. 4 illustrates the preferred embodiment infusion spiral of FIG. 1 in further combination with a lid and liquid container.

A combination of infusion spiral 105 with liquid container 46 is illustrated in FIG. 4. A cover 45 is preferably configured to enclose liquid container 46. For the purposes of this disclosure, it will be understood that cover 45 and liquid container 46 may take on any suitable geometry and size, and that the cylindrical geometry of liquid container 46 illustrated therein is merely for exemplary illustrative purposes. Similarly, the geometry and materials used in the fabrication of cover 45 will likewise be determined from the myriad of known or obvious variants. As can be seen therein, fastener 40 will most preferably couple with a mating fastener 41 affixed to cover 45. Infusion spiral 105 will then be inserted into container 46 and will be permitted to float therein. When infusion spiral 105 is attached to cover 45, and cover 45 is then removed, infusion spiral 105 will likewise be removed from liquid container 46.

When more than one infusion spiral 105 is desired to be inserted into container 46, such as to speed flavor infusion into the liquid or to increase the ultimate strength of flavor imparted to the liquid, the opposing fasteners 40 that are adjacent to terminus 100 and 101 will both be used, and one infusion spiral 105 may then be coupled through a fastener 40 to a next infusion spiral 105, rendering the appearance of a string of sausages. In this way, one or more infusion spirals 105 may be affixed to a cover 45, and removed therewith. Consequently, the infusion spirals 105 do not need to be retrieved by reaching into the liquid, and instead will be readily removed therefrom without any need for directly contacting the liquid.

Alternatively, infusion spiral 105 may be secured to any of the sides of container 46, or simply dropped into the liquid, though such approaches are generally less preferable owing to the potential need to reach into the liquid.

Figure 5:
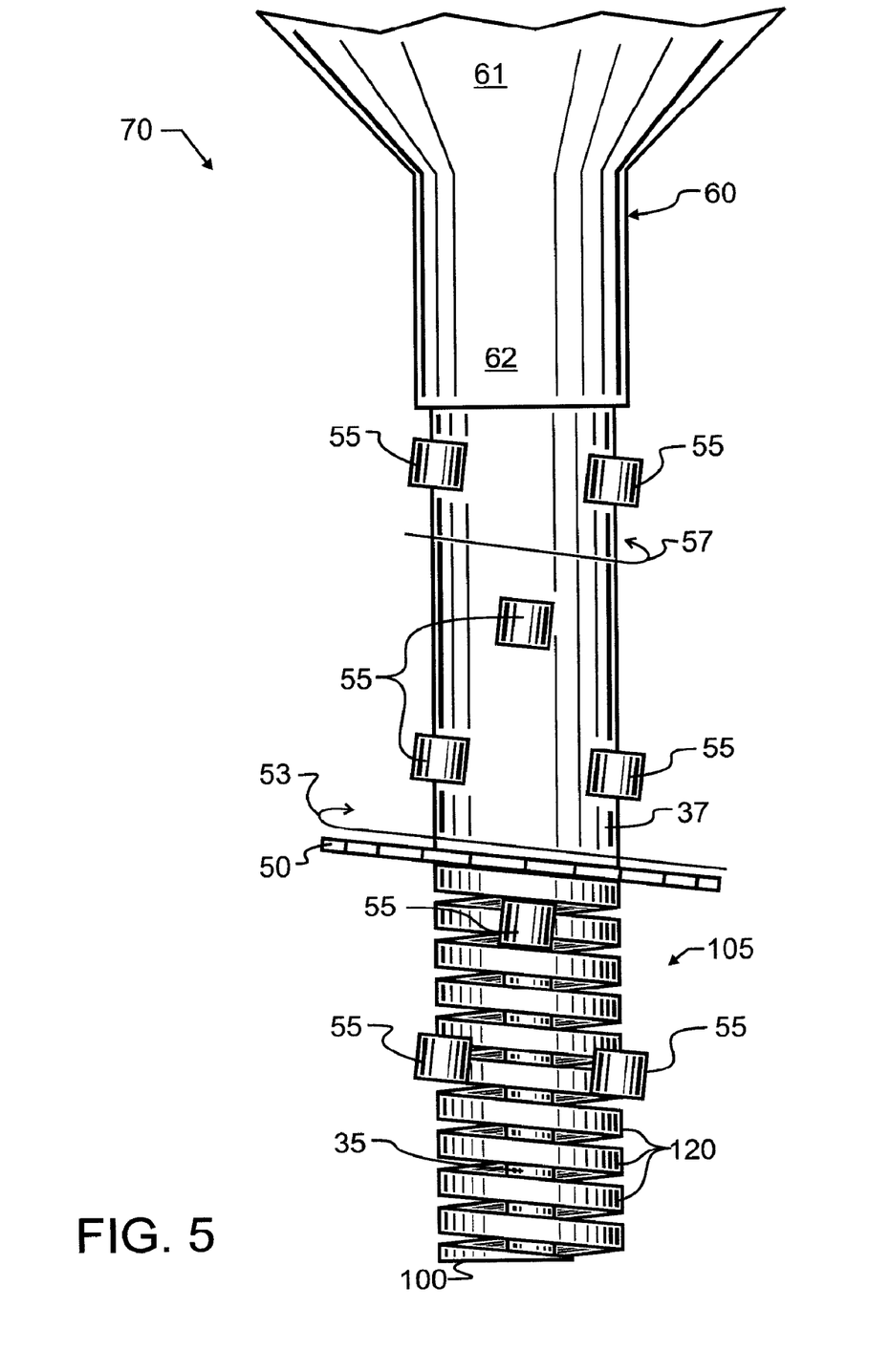
FIG. 5 illustrates a preferred machine for manufacturing the preferred embodiment infusion spiral of FIG. 1, from a side plan view.

A machine 70 for manufacturing infusion spiral 105 is illustrated in FIG. 5. Most preferably, a receiver 60 such as a funnel-shaped hopper or the like is positioned to have an inlet 61 at a top thereof and taper to a bottom outlet 62. As a result of the vibration during operation, such receiver 60 will effect a selection of only a single one of a plurality of wooden rods that are deposited within receiver 60 at any given time. As the single rod 37 passes through outlet 62, it encounters a plurality of guide rollers 55 which serve to direct and control movement of the preform into a cutting blade 50. As illustrated, cutting blade 50 has a direction of rotation illustrated by arrow 53, and this rotation, which may be controlled or assisted by providing power to one or more of the guide rollers 55, causes rod 37 to rotate in the direction illustrated by arrow 57. Most preferably, blade 50 will not cut entirely through rod 37, but will instead stop at slightly less than the radius to consequently leave a core 35 which provides both strength and controlled spacing between adjacent surfaces 122 and 123.

Machine 70 may be designed with various mechanical, electro-mechanical, electrical and electronic components to monitor various functions and conditions. For example, infeed sensors may detect the presence or absence of rods 37 adjacent blade 50 and adjacent receiver outlet 62. An absence of either may be used to stop rotation of blade 50. Similarly, jams, clogs, content at receiver 60 or at an outlet of machine 70, and a myriad of other functions may all be monitored to ensure safe and proper operation of machine 70. With the fitting of such sensors and components, machine 70 may be designed to perform the entire formation of infusion spiral 105 from stock rod 37, without additional human intervention other than restocking of receiver 60 and periodic maintenance as it may be required, which might for exemplary purposes include such tasks as lubrication and cleaning, sharpening or replacement of blade 50.

Figure 6:
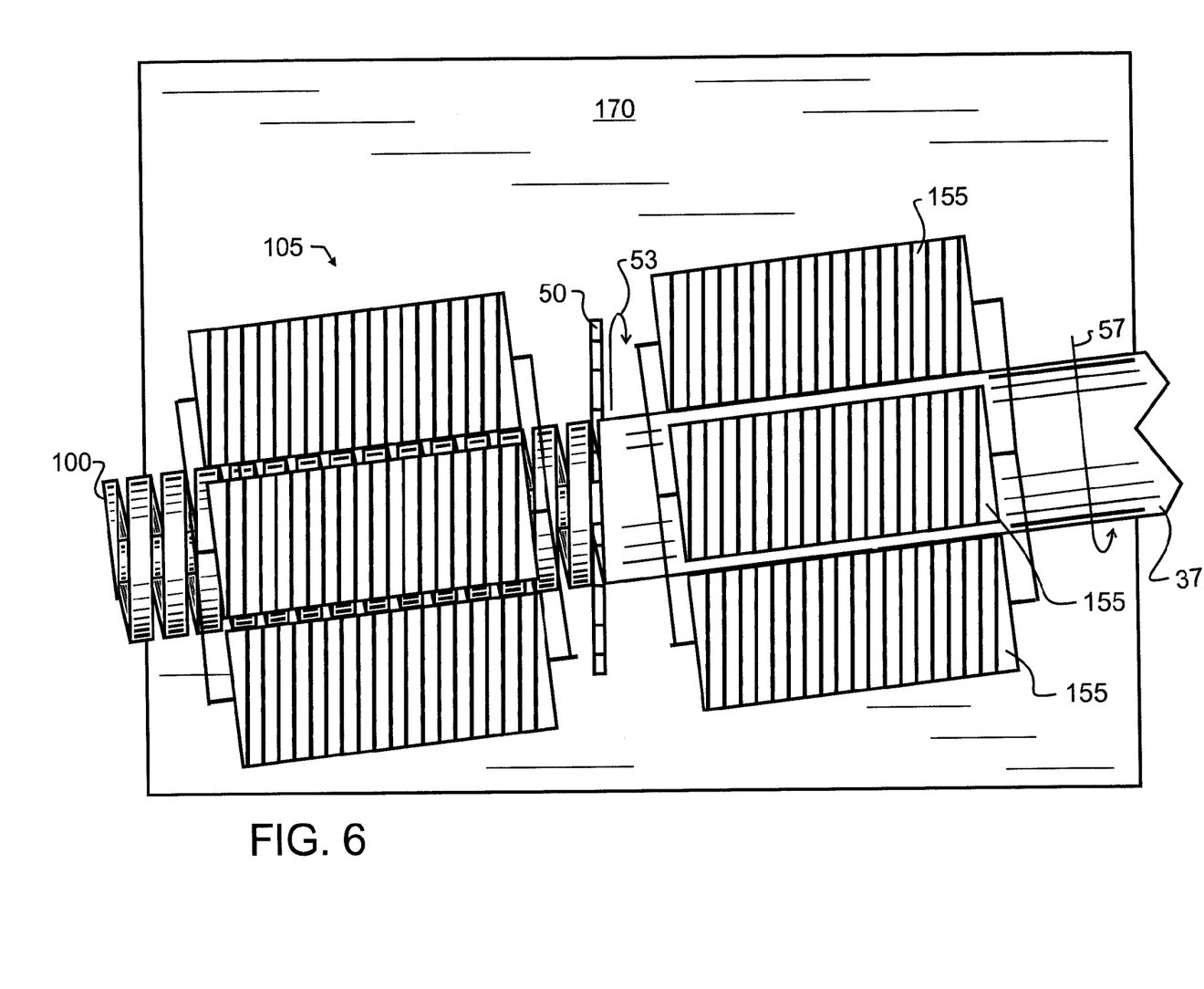
FIG. 6 illustrates an alternative machine for manufacturing the preferred embodiment infusion spiral of FIG. 1, from a side plan view.

An alternative machine 170 is illustrated in FIG. 6. Machine 170 includes at least one, and preferably three or more rollers 155. Rollers 155 are preferably spirally fluted, such that when rotated they will urge wooden rods 37 to move both circularly and longitudinally. Rollers 155 may be manufactured from many materials, but preferably an elastomeric material is used which will provide a desired combination of secure frictional engagement with an exterior of wooden rods 37, while simultaneously dampening any vibratory oscillations which might arise during cutting. As with machine 70, sensory and logic devices may be provided to enable automated operation, and various receivers at the inlets and outlets of rollers 155 may be provided.

Figure 8:
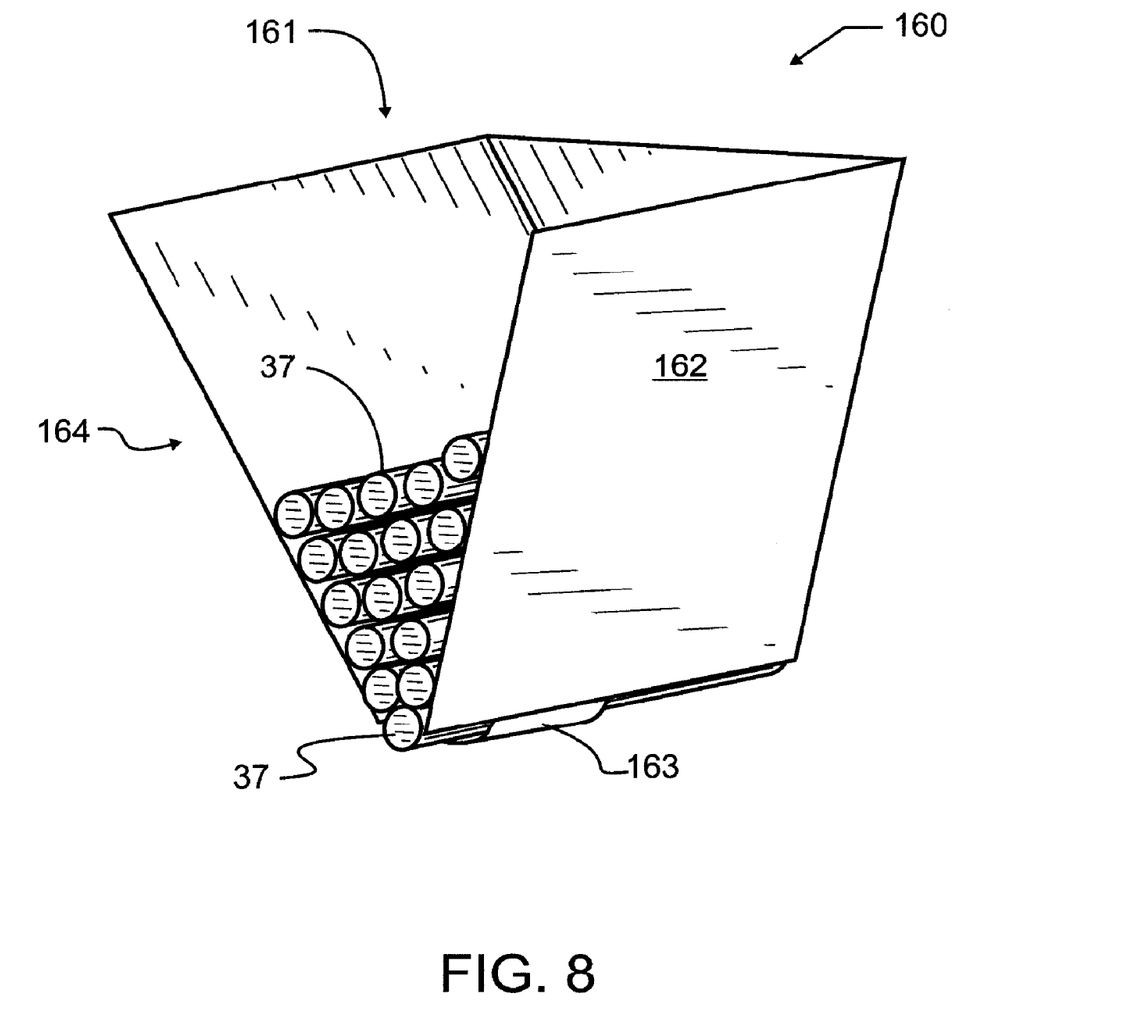
FIG. 8 illustrates an alternative hopper for feeding source lumber to either machine of FIG. 6 or FIG. 7 from a projected plan view.

An alternative hopper 160 which may be used in association with either machine 70 or machine 170 for manufacturing infusion spiral 105 is illustrated in FIG. 8. Most preferably, hopper 160 has a hollow and inverted triangular prism shape as illustrated therein. The size and orientation of inlets such as inlet 161 at a top thereof are adaptable to a desired need in a production environment. For the purposes of illustration and example and not limited thereto, a second inlet 164 has been illustrated, which would permit loading from the side as well as or instead of the top inlet 161. The sides of hopper 160 most preferably taper to a bottom outlet 162, which is dimensioned to allow only a single wooden rod 37 to pass through. As a result of the vibration during operation, wooden rods 37 will drop into position adjacent bottom outlet 162. Most preferably, some type of mechanical fed control is provided adjacent bottom outlet 162, such as a small stop finger 163 illustrated therein. Stop finger 163 may be manually or automatically controlled to pivot sufficiently to permit a single wooden rod 37 to drop, but will then preferably return to a position which is blocking bottom outlet 162. This type of dispensing mechanism is well known in the art of straw dispensers, and will be determined by those skilled in the art upon a reading of the present disclosure to be well suited for application to the present invention. Receiver 160 will consequently effect a selection of only a single one of a plurality of wooden rods 37 that are deposited within receiver 160 at any given time. As the single rod 37 passes through outlet 162, it will most preferably encounter guide rollers 55, 155 or the like which serve to direct and control movement of the preform into a cutting blade.

Figure 7:
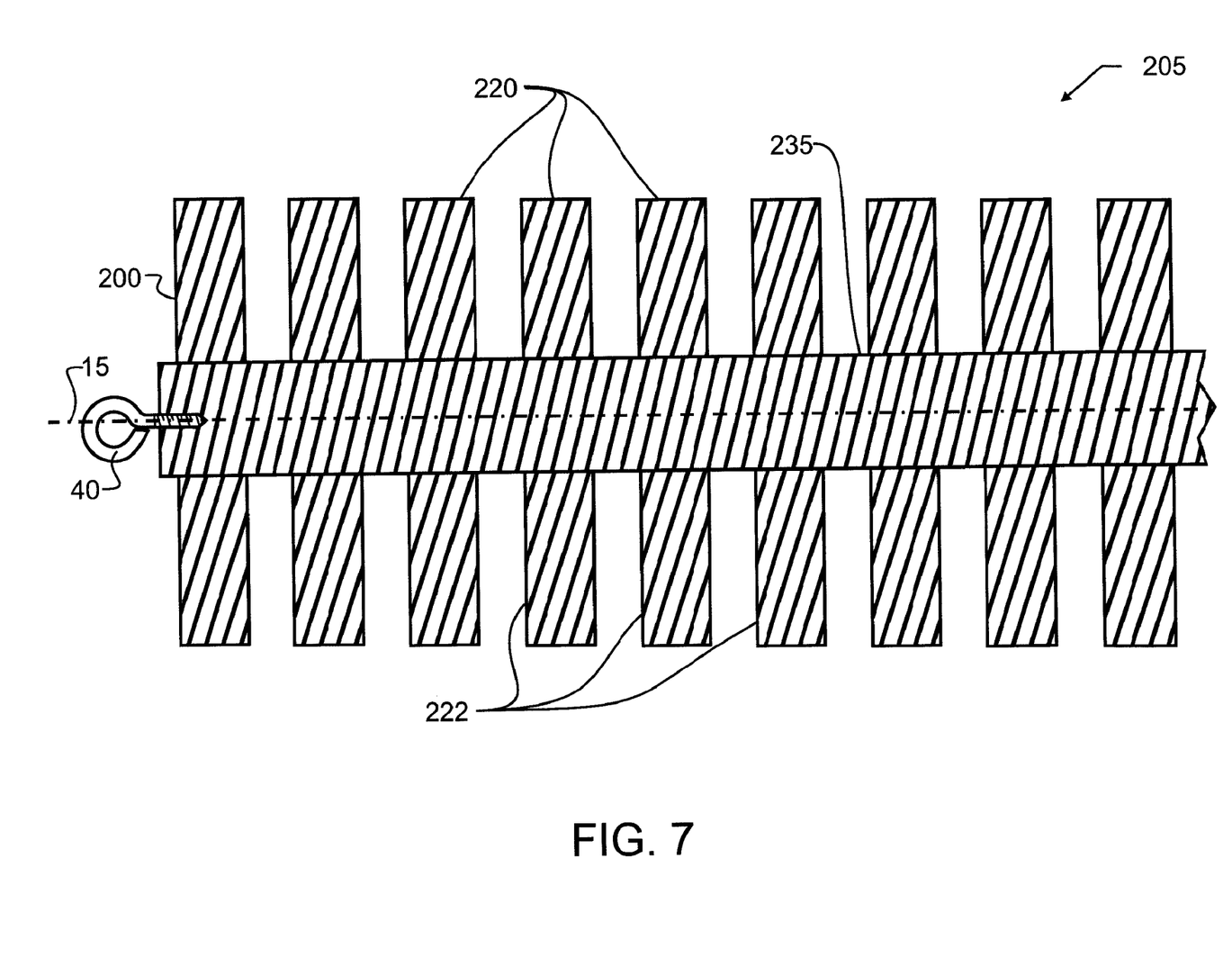
FIG. 7 illustrates a first alternative embodiment designed in accord with the teachings of the present invention from a cross-section view taken along a longitudinal axis.

A second embodiment infusion apparatus 205 is illustrated in FIG. 7. A multitude of wooden discs 220 are located in spaced arrangement and held fixedly in position by a rod 235 that defines a longitudinal central axis 15. Most preferably, fibers 30 within each of the wooden discs 220 and rod 235 run parallel to central axis 15. Discs 220 may be oriented at any angle relative to rod 235. However, for ease of machining and assembly, discs 220 will typically extend radially from rod 235. Rod 235 may be comprised of any material that does not react negatively with the liquid in which infusion apparatus 205 will be immersed. To increase infusion, rod 235 may be comprised of a wood similar to discs 220. It is not necessary to the present invention, though, that rod 235 be comprised of wood. Instead, the composition of rod 235 may be determined based upon flavor or other infusion characteristics or based solely upon cost. Furthermore, it is not necessary that each one of the plurality of discs 220 be comprised of the same wood, have the same grain orientation, or be of the same thickness as each other of the plurality. Instead, custom combinations of woods, orientations and thicknesses may be fabricated to provide most preferred infusion characteristics and times, as may be desired for a particular application.

As should now be apparent, the overall size, number of individual discs 220, angle of incline of surfaces 122, 123, and other dimensions of infusion apparatus may vary and may be customized to each container such as container 46 in which the infusion spirals 105, 205 will be used and according to the desired strength of the wood flavoring and the desired speed with which such flavor is imparted. In one embodiment of the present invention, the infusion spiral 105 is eighteen inches in length. As should also be apparent, the formation of spirals or discs creates a very large exposed surface area, preferably of end grain or open fibers normal to the surface, which in turn translates into substantial infusion in a short period of time from a relatively small and self-contained infusion apparatus 105 or 205.

While the foregoing details what is felt to be the preferred embodiment of the invention, no material limitations to the scope of the claimed invention are intended. Further, features and design alternatives that would be obvious to one of ordinary skill in the art are considered to be incorporated herein. For exemplary purposes, while the present disclosure refers at times to containers of aged wine for infusion, it should be understood that the reference is for the purpose of illustration, not limitation, and that the same features apply to imparting a flavor and other attributes of wood aging to any liquid in any type and composition of container. Likewise, in another embodiment of the present invention, an infusion spiral 105 may be used in conjunction with a wood container to impart the flavor of a type of wood different from the container or to speed the rate at which the wood flavor is imparted to the wine. Similarly, various woods may be combined using known techniques to obtain a most desired set of infusion characteristics. Consequently, the scope of the invention is set forth and particularly described in the claims herein below.

We claim:

1. An infusion spiral suitable for aging liquids in a container, comprising:
    a generally cylindrical outline defining a longitudinal central axis;
    wood fibers within said generally cylindrical outline and extending generally parallel to said longitudinal central axis;
    a first longitudinal end;
    a second longitudinal end distal to said first longitudinal end;
    at least one spiral formed into said outline extending substantially between said first longitudinal end and said second longitudinal end defining inclined plane surfaces having said wood fibers exposed and aligned generally normal thereto, said inclined plane surfaces comprising a majority of exposed surface area of said infusion spiral.

2. The wooden infusion spiral of claim 1 wherein said spiral is continuous between said first longitudinal end and said second longitudinal end.

3. The wooden infusion spiral of claim 1 comprising essentially wood.

4. The wooden infusion spiral of claim 3 wherein said wood is toasted.

5. A method for manufacturing an infusion spiral in an economical and automated fashion, comprising the steps of:
provingd a receiver having an inlet and an outlet;
receiving at an inlet of said receiver a plurality of longitudinally extensive wooden preforms, each of said preforms having first and second terminus;
permitting a single one of said plurality of longitudinally extensive wooden preforms to pass through said receiver outlet;
directing said single one of said plurality of longitudinally extensive wooden preforms into a cutting blade;
cutting a continuous spiral in said single one of said plurality of longitudinally extensive wooden preforms from said first terminus to said second terminus; and
toasting said single one of said plurality of longitudinally extensive wooden preforms to present a toasted exterior surface.

6. The method for manufacturing an infusion spiral of claim 5, further comprised by repeating the steps of permitting, directing and cutting until each of said preforms received at said receiver inlet have been permitted, directed and cut.

7. The method for manufacturing an infusion spiral of claim 5, further comprising the step of continuously rotating said single one of said plurality of longitudinally extensive wooden preforms during said cutting step.

8. The method for manufacturing an infusion spiral of claim 7 wherein said cutting blade performs said rotating step.

9. The method for manufacturing an infusion spiral of claim 7 wherein said cutting blade is angled with respect to a longitudinal axis of said single one of said plurality of longitudinally extensive wooden preforms.

* * * * *